MULTISTABLE CIRCUIT

Filed Nov. 19, 1956 3 Sheets-Sheet 1

*INVENTORS*
JOSEPH C. LOGUE
ROBERT A. HENLE
*BY*
Ralph L. Thomas
ATTORNEY 3,037,127
Patented May 29, 1962

3,037,127

MULTISTABLE CIRCUIT

Joseph C. Logue, Poughkeepsie, and Robert A. Henle, Hyde Park, N.Y., assignors to International Business Machines Corporation, New York, N.Y., a corporation of New York Filed Nov. 19, 1956, Ser. No. 622,885
22 Claims. (Cl. 307—88.5)

This invention relates to electrical and magnetic circuits and more particularly to such circuits employing superconductive materials in multistable devices.

After the discovery in 1911 by Kamerlingh Onnes of the phenomenon whereby the electrical resistance of a body of material disappears at a given temperature, various scientific investigations in this field have resulted in many findings, some of which were not readily predicted, if predictable at all. The findings in some instances are related by various writers to classical theories for explanation. In other instances the findings are presented phenomenologically since some classical theories fail to provide a complete explanation. The characteristic of some twenty-one elements, numerous compounds and countless alloys to change from a resistive or normal state to a condition of zero electrical resistance at given temperatures is referred to as superconductivity. When a material undergoes such a transition, it is appropriately termed a superconductor, and the temperature at which the transition takes place in a material is referred to as the critical temperature. The critical temperature varies with the different materials, and for each material this temperature is lowered as the intensity of the magnetic field around the material is increased from zero. Once a body of material is rendered superconductive, it may be restored to the resistive or normal state by the application of a magnetic field of given intensity, and the magnetic field necessary to destroy superconductivity is designated the critical field. Magnetic field intensity regardless of direction appears to be the controlling influence which destroys superconductivity. Many writings with a thorough and detailed presentation of the phenomena and theories relating to superconductivity are available, one of which is "Cambridge Monographs on Physics" (Superconductivity) second edition by D. Schoenberg. A description of one practical arrangement for securing low temperatures as well as one type of superconductive element which may be employed for various functions is presented in an article entitled, "The Cryotron—A Superconductive Computer Component" by D. A. Buck in the Proceedings of the I.R.E. for April 1956.

According to the present invention a unique and novel arrangement including superconductive materials is provided which serves as a multistable device. In one of its novel aspects the invention employs a cryoton component which includes a control conductor of superconductive material having a relatively high critical magnetic field and wound in the form of a coil, and associated therewith gate conductor means in the form of strands of wire composed of one or more superconductive material each having a relatively low critical magnetic field. As current is applied to the coil a magnetic field developed therearound influences the resistive condition of the wire. If two or more individual strands of wire associated with a coil are disposed to change from the superconductive to the normal condition in response to different values of current flow through the coil, they may be connected in a circuit arrangement to permit current flow to or divert current flow from a load device. If two devices of this type are employed, a multistable circuit may be obtained by cross-connecting the wires of each coil in series with the other coil and using the division of given units of current between the coils to represent various states of stability. The existing stable state may be changed to another stable state by supplying a current pulse to either of the coils, thereby changing the resistive condition of the associated wire or wires and hence the division of current through the coils.

In another of its novel aspects the present invention includes several variations in the arrangement of the wires and an associated coil to secure a desired pattern of resistance in the wire versus current in the coil. In a further arrangement two or more types of superconductive material are employed in the construction of the various wire strands for the purpose of securing a desired pattern of resistance in the wire strands versus current in the coil. The geometrical arrangement of the wire and coil, type of material used in the wires, and size of the wire may be varied interchangeably to secure a desired characteristic of resistance in the wire versus current in the coil. Circuits of this type are adaptable in general to the purposes of electrical conversion apparatus and in particular to sensing devices employed with superconductive circuits.

Accordingly, it is an object of the present invention to provide a novel multistable circuit.

Another object of the present invention is to provide a novel multistable circuit employing superconductive elements.

A further object of the present invention is to provide a multistable superconductive device which may be nondestructively sensed for any one of a plurality of stable conditions.

A still further object of the present invention is to provide a multistable superconductive device which includes a pair of coils and M–1 discrete values of resistance provided by a wire means associated with each coil where M is any positive integer.

Yet another object of the present invention is to provide a sensing device which employs a coil and associated wire strands arranged to provide a distinctive value of resistance in the wire strand as a function of current in the coil.

Still another object of the present invention is to provide a superconductive device capable of being used as a converter which responds to current in a coil and yields an output which is unique to the value of current in the coil.

Another object of the present invention is to provide a circuit capable of assuming any one of a plurality of stable conditions which employs superconductive elements arranged in the form of coils which are cross-connected to superconductive wires associated with another coil.

Other objects of the invention will be pointed out in the following description and claims and illustrated in the accompanying drawings, which disclose, by way of example, the principle of the invention and the best mode, which has been contemplated, of applying that principle.

Figure 1:
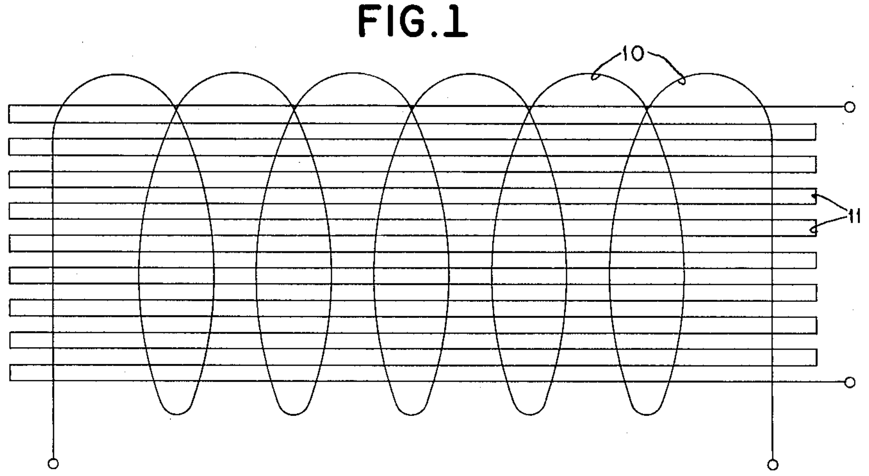
FIG. 1 is a circuit schematic of one arrangement of a coil and wire strands of superconductive material according to the present invention.

Referring first to FIG. 1, there is shown a control conductor in the form of a coil or solenoid 10 within which a gate conductor in the form of a plurality of strands or sections of wire 11 are placed. The wire 11 is composed of superconductive material which preferably has a low critical magnetic field and the different strands or sections of the wire respond differently to magnetic fields applied by coil 10. The coil 10 is preferably composed of a superconductive material although this is not essential, and if a superconductive material is used, it is preferably one having a relatively high critical magnetic field. One suitable combination of materials for the coil 10 and the wire 11 is niobium and tantalum respectively, although many other combinations may be equally adaptable. For example, as will later be explained in more detail with reference to FIG. 3, the various sections of the wire 11 may consist of different superconductor elements, alloys or compounds having different critical fields at the operating temperature. Whenever current flows through the coil 10, a magnetic field is established within the coil, the intensity of which is maximum in regions adjacent the turns of the coil and approaches a minimum near the central regions of the coil. Thus the intensity of the magnetic field of the coil is inversely related to the distance along the radius. When a current is applied to the coil 10, the magnetic field created within this coil is maximum on the outer strands of the wire 11 and minimum on the strands constituting the central portion of the wire. If the wire 11 is superconductive and the intensity of the magnetic field created by the coil 10 is less than the critical field of the wire 11, this wire continues in the superconductive state exhibiting zero resistance. If the magnitude of current flow through the coil 10 is increased, a value is reached which creates a magnetic field at the outer strands of the wire 11 equal to the intensity of the critical magnetic field. In this case the outer strands are rendered normal and the wire is partly resistive. With further incremental increases in amplitude of current flow in coil 10, additional strands of the wire 11 toward the central region are rendered normal, thereby increasing the resistance of the wire 11 until ultimately all strands of the wire are rendered normal and its resistance is maximum. Accordingly, it is seen that as current in the coil 11 is increased from zero, an increasing magnetic field is created which eventually reaches the critical magnetic field of the wire 11, first on the strands adjacent to the coil 10 and ultimately on all strands including the strands in the center portion thereof. Consequently the resistance of the wire 11 is increased once the intensity of the magnetic field of coil 10 increases above the critical magnetic field of the wire 11.

Figure 2:
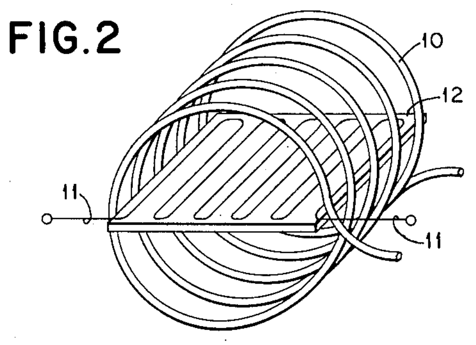
FIG. 2 illustrates a structural arrangement of the coil and wire shown schematically in FIG. 1.

In FIG. 2 the coil 10 and strands of wire 11 are shown in one physical arrangement with the strands of wire 11 supported on a substrate 12 and laid with a uniform pitch along a diameter of the coil 10. It is not essential that the pitch or number of strands of wire 11 per unit length along the diameter of coil 10 be uniform, for it may be desirable in some instances to secure a linear variation of resistance versus applied magnetic field; whereas in other instances it may be desirable to secure a non-linear variation. In order to secure the maximum magnetic field on the wire 11 per unit of current applied to the coil 10, the turns of coil 10 may be wound contiguous to each other in a very compact arrangement rather than widely separated as shown in FIG. 2.

Figure 3:
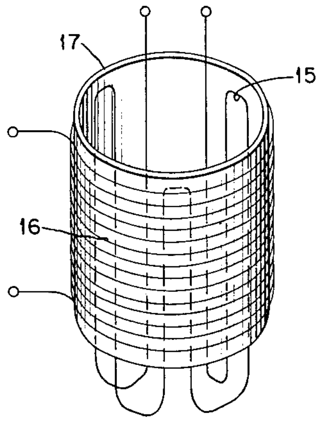
FIG. 3 is a structural arrangement of a coil and wire strands where two or more types of superconductive material are used to fabricate the wires.

Another technique for securing a variable resistance as a function of an applied magnetic field is illustrated in FIG. 3. Here the strands of a wire 15 are composed of two or more types of superconductive materials, and each strand may be positioned a uniform distance from the longitudinal axis of a coil 16 or as shown in FIGS. 1 and 2. The wiring 15 and the coil 16 are mounted on a substrate of cylindrical-shaped material which provides adequate support. If two different types of superconductive materials are used in the wire 15, it is seen that two discrete values of resistance in this wire are secured as a magnetic field around a coil 16, resulting from current flow therein, is increased from some value below the critical field of the first material to some value equal to or greater than the critical magnetic field of the second material. Similarly, the use of three or more different types of superconductive materials in the fabrication of the strands of wire 15 provide correspondingly three or more discrete values of resistance as the intensity of the applied magnetic field is varied from a value below the critical magnetic field of the material having the lowest critical magnetic field intensity to a value equal to or greater than the critical magnetic field of the material having the highest critical magnetic field intensity.

Figure 4:
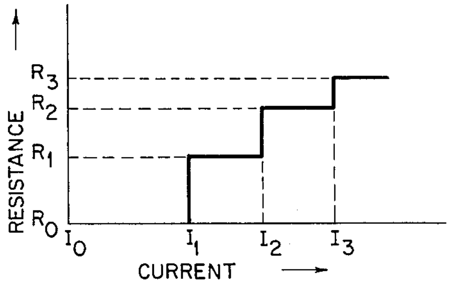
FIG. 4 illustrates one type of characteristic pattern of resistance in the wire strands versus current in a coil.

If current is applied in increments to the control conductor in the form of coil 10 in FIG. 1 as indicated by the curve in FIG. 4, the resistance of the wire 11 varies substantially as shown in this curve. The wire 11, as in the embodiment of FIG. 3, may include a number of superconductor materials having different critical fields where the field gradient adjacent the control conductor employed is not sufficient of itself to provide the desired incremental resistance characteristics using a single material. Current $I_1$ in coil 10 creates a magnetic field within this coil of sufficient intensity to equal the critical magnetic field of strands of wire 11 nearest to and adjacent the coil. The effect is to render a portion of the wire 11 normal, thereby creating a resistance $R_1$ in the wire 11. If the current in the coil 11 is increased to values $I_2$ and $I_3$, respective resistance values $R_2$ and $R_3$ are established in the wire 11 as the magnetic field intensity within the coil is incrementally increased toward its longitudinal axis. Where three different types of superconductive material are used in the wire of FIG. 3, a similar change in resistance of the wire 15 may be secured with changes in current through the coil 16 as the resultant increasing magnetic field equals the critical magnetic field of the three different types of superconductive material.

Hence it is seen that the circuit devices of FIGS. 1 through 3 may be employed to convert current amplitude in a coil to an equavalent resistance in an associated wire. Such circuit devices find general utility in electrical measuring apparatus as well as various types of conversion equipment. By varying the geometrical arrangement of the wire 11 within the coil 10 in FIG. 1, it is possible to secure various shaped patterns of resistance versus current in FIG. 4. Similar results can be secured in FIG. 3 by the choice of materials employed. Since the field is not a linear function of distance across any diameter of the coil in FIG. 1, this must be taken into account when a particular pattern of current versus resistance is desired in FIG. 4. The resistance of the wire strands in FIGS. 2 and 3 may be further varied by increasing or diminishing the cross-sectional area thereof as desired. The wire strands need not be solid wire, and in some instances thin films of superconductive material vacuum metalized, or otherwise coated on a substrate, are suitable.

In view of the foregoing description of FIGS. 1 through 4, various other arrangements of the wire strands without as well as within the coil or a combination of both, are readily seen.

Figure 5:
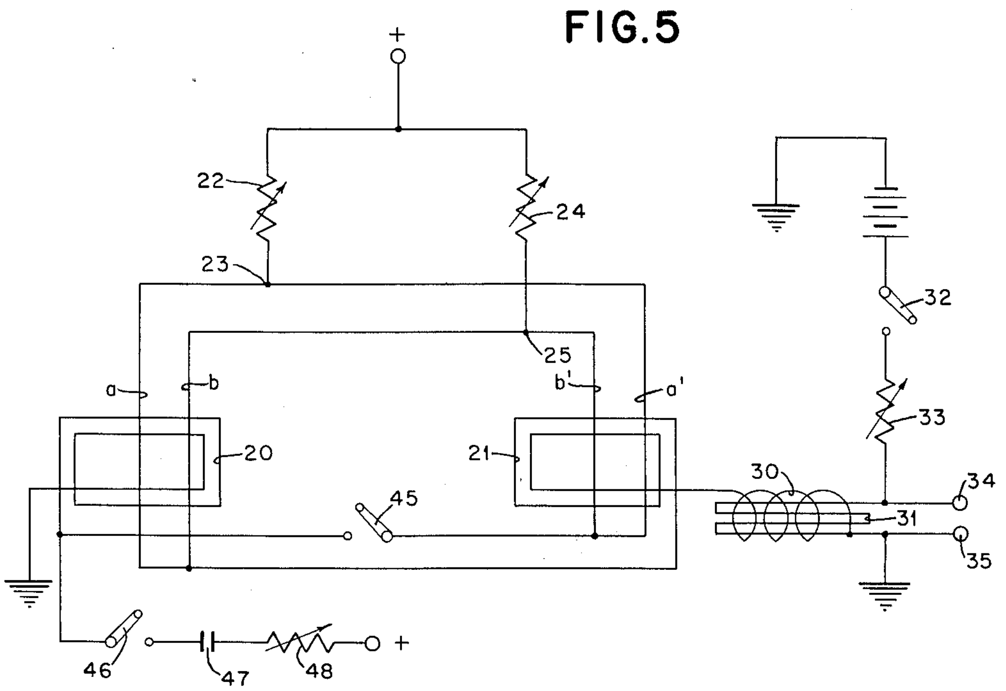
FIG. 5 illustrates a circuit arrangement which has three stable states.

According to a further embodiment of the present invention a circuit employing some of the principles of FIGS. 1 through 4 is shown in FIG. 5. This is a multistable circuit wherein the normal or superconductive condition of wire strands within a coil determines the stable conditions. A pair of control conductors in the form of coils 20 and 21 is connected as shown with a pair of gate conductors in the form of wires *a* and *b* passing through the coil 20 and a further pair of gate conductors in the form of wires *a'* and *b'* passing through the coil 21. The maximum current amplitude required in coils 20 or 21 for control purposes is that value which will cause the associated center wire *a* or *b'* to be rendered normal by the resultant magnetic field within the coil. This value of current is arbitrarily designated as two units of current, and the wires *b* and *a'* in respective coils 20 and 21 are disposed sufficiently near the inside surface of the coils and/or are of a different superconductive material having a lower critical field than the material of wires *a* and *b'* so that they are rendered normal by one unit of current in the associated coil. The self field around an individual one of the wires *a*, *b*, *a'* or *b'* as a result of a unit current flowing therein is insufficient to equal or exceed the critical magnetic field of the wire. A unit of current from a source is supplied through a resistor 22 to a junction 23; from this point the current flows through the wire *a* and the coil 21 to ground constituting one leg, or through the wire *a'* and the coil 20 to ground constituting a second leg. A unit of current from the source through a resistor 24 is supplied to a junction 25; from this point the current passes through the wire *b* and coil 21 to ground constituting one leg, or through the wire *b'* and coil 20 to ground constituting a second leg.

A circuit of this type may have three stable states, each of which is now described. A first stable state is obtained with two units of current flowing through the coil 20. If two units of current are supplied to the coil 20, it must flow from the source through the wires *a'* and *b'*. In order for this to occur, the wires *a'* and *b'* must be in the superconducting state, and the wires *a* and *b* must be in the normal state. In this case a unit current from the resistor 22 and a unit current from the resistor 24 are shunted from wires *a* and *b* because of the resistive condition thereof, and both currents flow through the respective superconductive wires *a'* and *b'* supplying two units of current to the coil 20. Once this condition is reached, it continues as a stable one since the wires *a* and *b* and the coil 20 are so arranged that with two units of current flowing through the coil 20 those portions of wires *a* and *b* under the influence of the magnetic field of this coil are maintained in the normal state; with wires *a'* and *b'* superconductive and wires *a* and *b* are normal, the two units of current continue to flow through the superconductive wires *a'* and *b'* and coil 20 to maintain wires *a* and *b* resistive and no current flows through normal wires *a* and *b* and coil 21. The circuit thus maintains itself stable in this state of current distribution.

A second stable state is similarly obtained with two units of current through the coil 21. In this instance the portions of the wires *a'* and *b'* under the influence of the magnetic field around the coil 21 are rendered normal and serve to shunt current from the source to the respective superconductive wires *b* and *a* which in turn convey one unit of current each to the coil 21. The normalizing effect on the wires *a'* and *b'* of the magnetic field around the coil 21 and the superconductive condition of the wires *a* and *b* in the coil 20 establish control effects which complement each other to maintain a state of equilibrium. In this condition of stability with the wires *a'* and *b'* normal, no current is applied to the coil 20.

A third stable state is obtained by having one unit of current flowing through the coil 20 and one unit of current through the coil 21. With one unit of current through the coil 20 the wire *a* will be in the superconductive state, and that portion of the wire *b* under the influence of the magnetic field within the coil 20 will be in the normal state. Similarly, with one unit of current through the coil 21 the wire *b'* is in the superconducting state, and that portion of the wire *a'* under the influence of the magnetic field within the coil 21 is in the normal state. This current from resistor 22 flows through the wire *a* and the coil 21 to ground. Current from the resistor 24 flows through wire *b'* and then through the coil 20 to ground. In other words the center wires *a* and *b'* are superconductive because the magnetic field along the longitudinal axis of the coils 20 and 21 when one unit of current flows in these coils is less than the critical field of the wires, but the magnetic field of the coils 20 and 21 on the wires *b* and *a'*, these wires being positioned very near the inside surface of the coils, is sufficient to equal or exceed the critical field of these wires. Therefore, the resistive portion of the wires *a'* and *b* serves to divert current from the source to the respective wires *a* and *b'*, thereby supplying one unit of current to each of the coils 20 and 21 which in turn continue the magnetic field which normalizes the wires *a'* and *b*. The two effects aid each other to continue this third condition of equilibrium. The necessary conditions which represent the three stable states are tabulated for convenience in Table 1 below:

*Table 1*

| Stable state | Units of current in coil 20 | Units of current in coil 21 | Wires [1] | | | |
|---|---|---|---|---|---|---|
| | | | a | b | a' | b' |
| 1 | 2 | 0 | N | N | S | S |
| 2 | 0 | 2 | S | S | N | N [2] |
| 3 | 1 | 1 | S | N | N | S |

[1] S=Superconductive; N=Normal. [2] Reset.

In order to use as information the conditions representing the three stable states, a coil 30, within which a stranded wire 31 is arranged as previously shown and described with respect to FIGS. 1 and 2, is connected in series with the coil 21 and ground. It is readily seen that with three discrete current values in the coil 21, each current value being associated with one of the three stable states described above, the resistance of the wire 31 assumes three discrete values. If a switch 32 is closed, current is supplied through a resistor 33 and the wire 31 to ground. Therefore three discrete values of voltage appear across output terminals 34 and 35 representing the three stable states. It is to be understood that other methods of sensing the stable states may be employed such as, for example, by connecting a load device in series with the resistor 33 and wire 31 to ground. In this instance three discrete current values can be supplied to a current responsive load device. An alternative arrangement for sensing the three stable states of the circuit in FIG. 5 is to employ a circuit including elements 30 through 35 in series with the coil 20 to ground. As a further technique for sensing the zero, one and two unit current conditions in the circuit of FIG. 5, a sense circuit of the type illustrated in FIG. 3 may be employed where the coil 16 and wire 15 may be substituted for the coil 30 and wire 31 in FIG. 5.

The three stable states which may be indicated as current in the coil 30 versus resistance in the wire 31, as it appears across the output terminals 34 and 35 in FIG. 5, may be as indicated in FIG. 4, where three discrete current values and three discrete resistance values may represent the three stable states, i.e., $I_0$, $I_1$ and $I_2$ with respective resistances $R_0$, $R_1$ and $R_2$.

Figure 6:
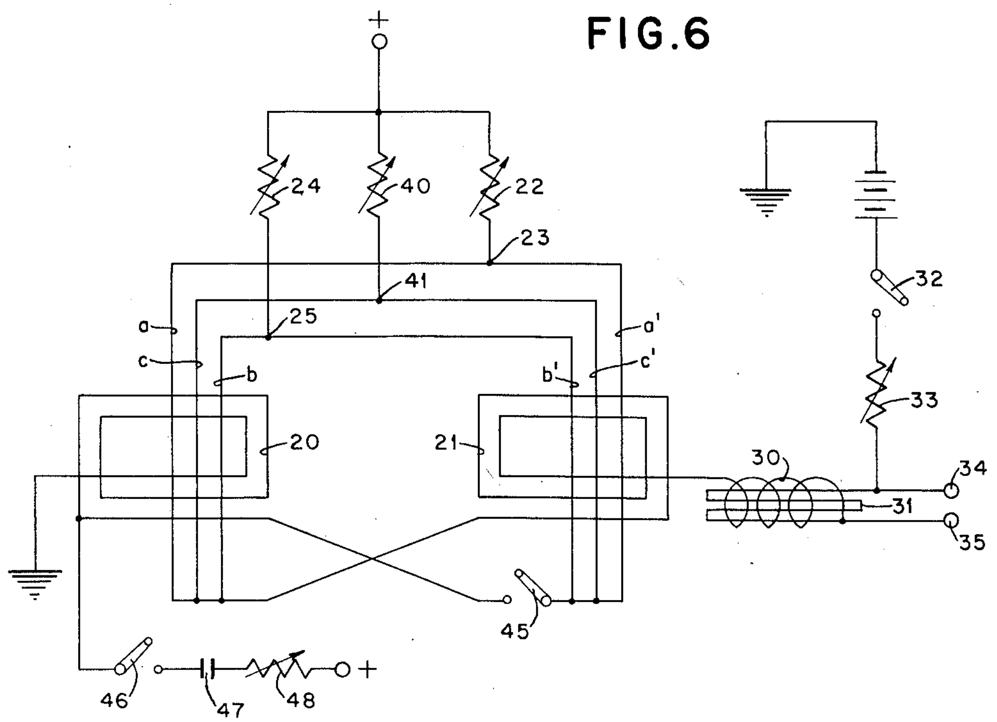
FIG. 6 illustrates a circuit arrangement which has four stable states.

The circuit arrangement of FIG. 5 is capable of being extended into a more elaborate system with N stable states being secured where N represents any positive integer. In FIG. 6, for example, a circuit capable of assuming four stable states is shown. The various parts corresponding to similar parts in FIG. 5 are labeled with like reference numerals. Here it can be seen that an added network including a resistor 40, a junction 41, connected to wires *c* and *c'* provides an added control current to the coils 20 and 21. The wires *a*, *c* and *b* and the coil 20 are so arranged that with no units of current through the coil 20 all of the wires *a, c* and *b* are superconductive. With one unit of current through the coil 20, wires *a* and *c* are superconducting and that portion of the wire *b* under the influence of the magnetic field of the coil 20 is rendered normal. With two units of current through the coil 20, the wire *a* is superconducting and the portions of the wires *c* and *b* under the influence of the magnetic field of the coil 20 are rendered normal With three units of current in coil 20, the portions of the wires *a, c* and *b* under the influence of the magnetic field of the coil 20 are rendered normal. The coil 21 and wires *a′, b′* and *c′* are arranged to provide a similar operation in response to like currents through the coil 21. A first stable state arises when the coil 20 has zero units of current and the coil 21 has three units of current. The wires *a, b* and *c* are then superconductive and the wires *a′, b′* and *c′* are normal. In this instance unit currents from the resistors 22, 24 and 40 flow through the respective wires *a, b* and *c* then through the coil 21 in series with the coil 30 to ground. The resistance of the normal wires *a′, b′* and *c′* diverts the current from the source through the wires *a, b* and *c* to the coils 21 and 30. A second stable state is obtained when the coil 20 has one unit of current and the coil 21 has two units of current. With one unit of current through the coil 20, the wire *b* is rendered normal and the wires *a* and *c* are rendered superconductive. With two units of current in the coil 21, the wires *a′* and *c′* are rendered normal and the wire *b′* is rendered superconductive. Thus a unit current through the resistor 24 flows through the wire *b′* and the coil 20 to ground; unit currents through the resistors 22 and 40 flow through the wires *a* and *c* to the coil 21 and then through this coil and the coil 30 to ground. A third stable state arises when the coil 20 receives two units of current and the coil 21 receives one unit of current. With two units of current in the coil 20, the wire *a* is superconductive and the portions of the wires *b* and *c* under the influence of the magnetic field of the coil 20 are rendered normal. With one unit of current in the coil 21, the magnetically influenced portion of the wire *a′* is rendered normal and the wires *b′* and *c′* are rendered superconductive. Thus unit currents through the resistors 24 and 40 flow through wires *b′* and *c′* and through the coil 20 to ground. The unit current through the resistor 22 flows through the wire *a* and then through the coils 21 and 30 to ground. A fourth stable state is obtained when the coil 20 carries three units of current, and the coil 21 carries zero units of current. In this case the wires *a, b* and *c* are then in their normal state and the wires *a′, b′* and *c′* are in their superconductive state. Therefore unit currents through the resistors 22, 24 and 40 flow through the wires *a′, b′* and *c′* then to the coil 20 and through this coil to ground. Hence it is seen that four stable states are obtained, and for convenience the necessary conditions which represent these states are tabulated in Table 2 below:

*Table 2*

| Stable state | Units of current in coil 20 | Units of current in coil 21 | Wires [1] | | | | | |
|---|---|---|---|---|---|---|---|---|
| | | | a | b | c | a′ | b′ | c′ |
| 1 | 0 | 3 | S | S | S | N | N | N |
| 2 | 1 | 2 | S | N | S | N | S | N |
| 3 | 2 | 1 | S | N | N | N | S | S |
| 4 | 3 | 0 | N | N | N | S | S | S |

[1] N=normal; S=superconductive.

In view of the foregoing discussion of FIG. 6, it is seen that a circuit with more than four stable states is readily secured by adding additional control wires and associated current control resistors such as control wires *c* and *c′* and the associated current control resistor 40.

In order to change the stable state of the devices in FIGS. 5 and 6, two switches may be employed for control purposes. Illustrating first with respect to FIG. 5, a switch 45 is opened when it is desired to establish the second condition of stability in Table 1 above, i.e., two units of current in the coil 21 and no units of current in the coil 20. When this switch is closed, the second stable state continues, and this state may be arbitrarily designated as a reset condition.

For other changes in state, an input pulsing device is employed which includes a switch 46, a condenser 47 and a resistor 48 serially connected to a source. If the circuit of FIG. 5 is in the reset condition when the switch 46 is closed, momentarily there is one unit of current in the coil 20 and two units of current in the coil 21. The one unit of current in the coil 20 causes the wire *b* to go normal, the effect of which is to reduce the current in the coil 21 to the point where the wire *b′* goes superconducting. Consequently the current in the coil 21 is reduced from two units to one unit, and the lost unit is diverted by the wire *b′* to the coil 20. To insure that the current in the coil 20 does not exceed substantially one unit, the time of decay of the input current pulse through the switch 46 is chosen to equal the time of build-up of current in the coil 20 from the wire *b′*. Thus the sum of the input current through the switch 46 and the feedback current through the wire *b′* is made substantially constant and equal to one unit. When the switch 46 is opened, the steady state of one unit of current in the coil 20 and one unit of current in the coil 21 continues. This represents the third stable state shown in Table 1 above. If the switch 46 is closed and opened again, a unit of current is supplied to the coil 20 momentarily. The increase in current through the coil 20 causes the magnetically influenced portion of the wire *a* to go normal; the consequence is to decrease the current through the coil 21 which in turn causes the wire *a′* to become superconductive; accordingly the wire *a′* conveys more current to the coil 20, thereby maintaining the wire *a* in the normal state after the switch 45 is opened. The condition of stability ultimately reached is two units of current in the coil 20 and no units of current in the coil 21 which is the first stable state in Table 1 above.

Hence it is seen how the circuit of FIG. 5 may be progressively stepped through its various stable states, first by resetting and then providing input current pulses to the coil 20. Whenever it is desired to reset the circuit of FIG. 6, a switch 45 is opened, then closed and the reset condition established by preventing current from flowing through the coil 20 and establishing three units of current in the coil 21. This is the first stable state in Table 2 above. If the switch 46 in FIG. 6 is momentarily closed then opened, a unit current is supplied through the resistor 48 and condenser 47 to the coil 20 to cause the stable state to be changed in a manner similar to that described in the circuit of FIG. 5. Here however the switch 46 must be closed three times in order to progress through the four stable states. Hence it is shown that by simply operating two switches selectively a multistable device may be reset then successively advanced through the various stable states and an output provided which is distinctive to each of the various stable states. While the switches are indicated for convenience as mechanical devices, it is to be understood that they may be electrical, electronic or other suitable types of devices.

Figures 7, 8, 9:
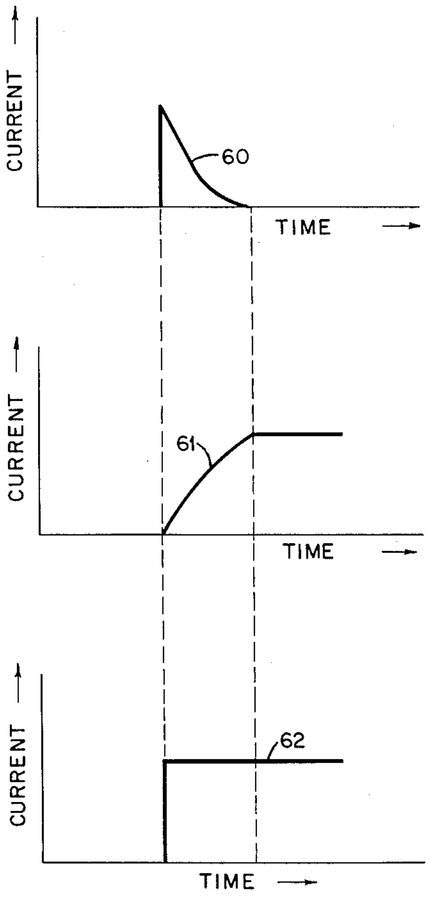
FIG. 7 illustrates the waveform of an input current pulse that is applied to the circuits of FIGS. 5 and 6 to change the stable state.
FIG. 8 illustrates the waveform of a feedback current during a change in state of the circuits of FIGS. 5 and 6.
FIG. 9 illustrates a current waveform used in the circuits of FIGS. 5 and 6 which waveform results from combining the current waveforms of FIGS. 7 and 8.

The relationship between the decay of an input pulse and the current rise of a feedback current to the coil 20 in FIG. 5 is shown in FIGS. 7, 8 and 9 with idealized waveforms. Pulse 60 in FIG. 8 represents an input current pulse supplied to the coil 20 in FIG. 5 when the switch 46 is closed. The feedback current to the coil 20 during a change in state is represented by the waveform 61 in FIG. 8. The decay of current pulse 60 and the rise in current of waveform 61 provides a resultant current through the coil 20 which is substantially a square-shaped wave as indicated by the waveform 62 in FIG. 9.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A multistable device including a pair of coils constructed of superconductive materials having relatively high critical magnetic fields, each coil having associated therewith a plurality of wire strands each composed of a different superconductive material having a relatively low critical magnetic field and arranged in magnetic field applying relation to the associated wire strands, said wire strands of each coil being cross-connected serially with the other coil across a current source, whereby the resistive condition of said wire strands controls the division of current through said coils.

2. The apparatus of claim 1 including a source of current pulses selectively coupled to one coil of said pair for changing the existing stable state of said multistable device.

3. The apparatus of claim 1 including means coupled to one of said coils for detecting the stable state of said multistable device.

4. The apparatus of claim 1 including a reset means for setting said multistable device to a predetermined state.

5. A multistable device including a pair of parallel circuits connected across a source of current, each parallel circuit including a coil serially-connected with a group of parallel-connected wire strands, said coil in each parallel circuit being physically disposed adjacent to said group of parallel-connected wire strands of the other of said parallel circuits, said coils being constructed of superconductive materials having high critical magnetic fields and said wire strands being constructed of superconductive materials having relatively lower critical magnetic fields, the magnetic field around each of said coils resulting from current flow therein serving to influence the resistive condition of wire strands in the group physically disposed adjacent thereto, whereby the resistive condition of said wire strands controls the division of current flow in said coils which division may be representative of multiple stable conditions.

6. The apparatus of claim 5 including means to reset said device to a predetermined state and advance said device through the various stable states.

7. The apparatus of claim 6 including means to detect any one of the various stable conditions.

8. A multistable device including first and second coils constructed of superconductive materials having relatively high critical magnetic fields, first and second groups of wire strands constructed of superconductive materials having relatively lower critical magnetic fields, said first and second groups of wire strands being associated with respective ones of said first and second coils, each of said coils being arranged in magnetic field applying relation to the associated group of wire strands, a source of current, said first group of wire strands being connected in parallel with each other, said first group of wire strands and said second coil being connected in series across said source, said second group of wire strands being connected in parallel with each other, said second group of wire strands and said first coil being connected in series across said source, whereby magnetic field around said coils influences the resistive condition of associated wire strands and said wire strands in turn control the division of current flow through said coils and multiple conditions of current flow represent various stable states.

9. The apparatus of claim 8 wherein a means is coupled to said device to change the stable conditions and provide an output indicative of the stable states.

10. A circuit comprising a gate conductor means having a plurality of superconductive sections, control conductor means disposed in magnetic field applying relation to said sections and when energized by a first magnitude of current therein being effective to produce in the vicinity of a first one of said sections a magnetic field sufficient to cause that section to undergo a complete transition to a resistive state but being then ineffective to produce in the vicinity of a second one of said sections a magnetic field sufficient to cause that section to undergo such a transition, said control conductor when energized with a larger magnitude of current being effective to produce in the vicinity of said first and second sections magnetic fields sufficient to cause each to undergo a complete transition to a resistive state, said first and second sections of said gate conductor means being connected in parallel, and means for supplying currents of said first and second magnitudes to said control conductor means.

11. The circuit of claim 10 wherein said first and second sections of said gate conductor means comprise first and second different superconductive materials having different critical magnetic fields.

12. A multistable device comprising first, second, third, and fourth superconductive gate conductors, first control conductor means disposed in magnetic field applying relation to said first and second gate conductors for controlling the state, superconductive or resistive, of said first and second gate conductors, second control conductor means disposed in magnetic field applying relation to said third and fourth gate conductors for controlling the state, superconductive or resistive, of said third and fourth gate conductors, said first and second gate conductors being connected in parallel with respect to a source of current for said circuit, said third and fourth gate conductors being connected in parallel with respect to a source of current for said circuit, each of said first and second gate conductors being connected in series with said second control conductor means and each of said third and fourth gate conductors being connected in series with said first control conductor means.

13. A multistable device including a pair of control conductors each of superconductive material having a relatively high critical magnetic field, each control conductor having associated therewith a plurality of individual parallel connected gate conductors each of superconductive material having a relatively lower critical magnetic field, each control conductor being arranged in magnetic field applying relation to the associated gate conductors, said individual gate conductors of each control conductor being cross-connected serially with the other control conductor across a current source.

14. The circuit of claim 13 wherein a first one of said gate conductors comprises a first superconductive material having a first critical magnetic field and a second one of said gate conductors comprises a second superconductive material having a different critical magnetic field.

15. A multistable device including a pair of parallel circuits, each parallel circuit including a control conductor serially-connected with a group of parallel-connected gate conductors, said control conductors in each parallel circuit being physically disposed adjacent to said group of parallel-connected gate conductors of the other of said parallel circuits, each of said control conductors being constructed of a superconductive material having a high critical magnetic field and each of said gate conductors being constructed of a superconductive material having a relatively lower critical magnetic field, the magnetic field around said control conductors resulting from current flow therein serving to influence the resistive condition of gate conductors in the group physically disposed adjacent thereto.

16. A multistable device including first and second control conductors constructed of superconductive material having relatively high critical magnetic fields, first and second groups of gate conductors constructed of superconductive material having relatively lower critical magnetic fields, said first and second groups of gate conductors being arranged to be responsive to magnetic fields produced by current in respective ones of said first and second control conductors, a source of current, said first group of gate conductors being connected in parallel with each other, said first group of gate conductors and said second control conductor being connected in series across said source, said second group of gate conductors being connected in parallel with each other, said second group of gate conductors and said first control conductor being connected in series across said source.

17. A multistable device comprising first and second circuits, connected in parallel with a source of current, said first circuit including as a part thereof a first gate conductor means comprising superconductor material and responsive in accordance with a magnetic field applied thereto to assume first, second and third different resistance states, said second circuit including as a part thereof a second gate conductor comprising superconductor material and responsive in accordance with a magnetic field applied thereto to assume first, second and third different resistance states, a first control conductor means disposed in magnetic field applying relationship to said first gate conductor means for controlling said first gate conductor means between the first, second and third resistance states it is capable of assuming, and a second control conductor means disposed in magnetic field applying relation to said second gate conductor means for controlling said second gate conductor means between the first, second and third resistance states it is capable of assuming, whereby said device is caused to assume first, second and third stable states in each of which the current from said source divides between said parallel circuits in a distinct manner in accordance with the states of said gate conductor means.

18. The circuit of claim 17 wherein each of said first and second gate conductor means is completely superconductive in one of the states it is capable of assuming.

19. A multistable device comprising first and second circuits connected in parallel with a source of current, said first circuit including as a part thereof a first superconductive gate conductor means the resistance of which is controllable between first, second and third different values in accordance with a magnetic field applied thereto, said second circuit including as a part thereof a second gate conductor means the resistance of which is controllable between first, second and third values in accordance with a magnetic field applied thereto, a first control conductor means disposed in magnetic field applying relationship to said first gate conductor means for controlling the resistance of said first gate conductor means between said first, second and third values thereof, and a second control conductor means disposed in magnetic field applying relation to said second gate conductor means for controlling the resistance of said second gate conductor means between said first, second and third values thereof, said first gate conductor means and said second control conductor means being connected in series with said source of current.

20. The circuit of claim 19 wherein the said first resistance value of each of said first and second gate conductors is zero.

21. A circuit comprising gate conductor means, said gate conductor means comprising at least first and second individual superconductive sections, said first section being of a superconductive material having a first critical magnetic field, said second section being of a superconductive material having a second critical magnetic field different than that of said first section, and control conductor means arranged in magnetic field applying relation to said superconductive sections of said gate conductor means for controlling the state, superconductive or resistive, of said sections of said gate conductor means, said first and second individual sections being series connected in said circuit so that current flowing in said first section must necessarily flow in said second section of said gate conductor means.

22. A circuit comprising gate conductor means, said gate conductor means comprising at least first and second individual superconductive sections, said first section being of a superconductive material having a first critical magnetic field, said second section being of a superconductive material having a second critical magnetic field different than that of said first section, and control conductor means arranged in magnetic field applying relation to said superconductive sections of said gate conductor means for controlling the state, superconductive or resistive, of said sections of said gate conductor means, said first and second sections being parallel connected in said circuit so that the current in said first section of said gate conductor means may be different than the current in said second section of said gate conductor means.

References Cited in the file of this patent

UNITED STATES PATENTS

| | | |
|---|---|---|
| 1,822,129 | Craig | Sept. 8, 1931 |
| 2,682,615 | Sziklai | June 29, 1954 |
| 2,832,897 | Buck | Apr. 29, 1958 |
| 2,852,732 | Weiss | Sept. 16, 1958 |
| 2,935,694 | Schmitt | May 3, 1960 |